(12) United States Patent
Tabota (10) Patent No.: US 6,786,095 B2
(45) Date of Patent: Sep. 7, 2004

(54) ACCELERATION SENSOR (75) Inventor: Jun Tabota, Toyama-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/957,926

(22) Filed: Sep. 21, 2001

(65) Prior Publication Data
US 2002/0069702 A1 Jun. 13, 2002

(30) Foreign Application Priority Data
Sep. 29, 2000 (JP) ........................................ 2000-298007

(51) Int. Cl.$^7$ ....................... G01P 15/097; G01P 15/09; G01I 41/053
(52) U.S. Cl. ................. 73/514.29; 73/514.34; 310/332; 310/353
(58) Field of Search .................... 73/514.12, 514.34, 73/514.29; 310/331, 332, 353

(56) References Cited

U.S. PATENT DOCUMENTS

| | | | |
|---|---|---|---|
| 4,346,597 A | * | 8/1982 | Cullen .......................... 73/510 |
| 4,814,753 A | * | 3/1989 | Coppola ..................... 340/689 |
| 5,063,782 A | * | 11/1991 | Kellett ..................... 73/514.34 |
| 5,515,725 A | * | 5/1996 | Tabota et al. ............. 73/514.34 |
| 6,078,126 A | * | 6/2000 | Rollins et al. ............... 310/330 |

FOREIGN PATENT DOCUMENTS

| | | |
|---|---|---|
| DE | 42 13 135 A1 | 10/1993 |
| JP | 61-178667 A | 8/1986 |
| JP | 4361165 | 12/1992 |
| JP | 6273439 | 9/1994 |

OTHER PUBLICATIONS

Franz, English translation of DE 42 13 135 A1, Oct. 1993.

* cited by examiner

Primary Examiner—Hezron Williams
Assistant Examiner—John C Hanley
(74) Attorney, Agent, or Firm—Keating & Bennett, LLP (57) ABSTRACT An acceleration sensor includes a first resonator and a second resonator which resonate at independent frequencies and each of which includes a piezoelectric body and electrodes arranged on both main surfaces thereof, and a first base plate and a second base plate. A first unimorph type acceleration detection element includes the first resonator bonded to one surface of the first base plate, and a second unimorph type acceleration detection element includes the second resonator bonded to one surface of the second base plate. Each of the first and second unimorph type acceleration detection elements is fixed at one longitudinal end thereof or opposed longitudinal ends thereof such that the first resonator and the second resonator are diametrically opposed to each other or are arranged to face each other to allow the first resonator and the second resonator to independently deflect in response to the application of acceleration. When the two acceleration detection elements are independently deflected in response to the application of acceleration, acceleration is detected by detecting a difference between frequency changes of the first resonator and the second resonator or a difference between impedance changes of the first resonator and the second resonator.

7 Claims, 9 Drawing Sheets

ACCELERATION SENSOR

BACKGROUND OF THE INVENTION

1. Field of the Invention

The present invention relates to an acceleration sensor.

2. Description of the Related Art

Japanese Patent No. 2780594 discloses an acceleration sensor employing a piezoelectric ceramic. This acceleration sensor includes a bimorph type detection element which is produced by laminating a pair piezoelectric devices formed of piezoelectric ceramics into a unitary body. The detection element is supported at both ends thereof and housed in a casing. When acceleration acts on the acceleration sensor, the detection element is deflected, and stress is generated in the defection element. The acceleration sensor detects acceleration, by detecting charge or voltage generated through piezoelectricity. The acceleration sensor is compact enough to be easily structured into a surface-mounting component (a chip component).

In the acceleration sensor working on this principle, a bias current flowing from a circuit of the sensor into the piezoelectric body is charged in a capacitor C of the piezoelectric body, and a resistor R is thus required to leak the bias current. The resistor R and the capacitor C form a filter, thereby leaving a direct current and a low frequency component below a cutoff frequency thereof undetected.

In a known acceleration sensor (disclosed in Japanese Unexamined Patent Application Publication No. 4-361165), two vibrators are mounted on a flex-type tuning fork support body. When acceleration acts on the vibrators, the vibrators mounted the tuning fork support structure are subject to tensile stress and compressive stress at central inertia portions (weight portions), and acceleration is detected from a frequency difference taking place between the two vibrators. This acceleration sensor detects a direct-current and low-frequency components.

Since the acceleration sensor thus constructed has the support body of tuning fork, the design of the structure becomes complex and bulky, and extensions of electrodes from the vibrators are also complex. It is therefore difficult to arrange this acceleration sensor in a miniature surface-mounting component (a chip component) which may directly be mounted on a printed circuit board.

The tuning fork vibrator is designed as a bimodal tuning fork vibrator to vibrate in a combination vibration mode in which a torsional vibration mode and a flexural vibration mode are combined, thereby reducing dependency of a bias frequency on temperature. This arrangement fails to fully eliminate the temperature dependency thereof.

SUMMARY OF THE INVENTION

Accordingly, it is an object of the present invention to provide a compact and high-gain acceleration sensor which is surface-mounted and insensitive to factors such as temperature changes other than acceleration.

The present invention in a first aspect relates to an acceleration sensor and includes a first resonator and a second resonator which resonate at independent frequencies and each of which includes a piezoelectric body and electrodes arranged on both main surfaces thereof and a first base plate and a second base plate, wherein a first unimorph type acceleration detection element includes the first resonator bonded to one surface of the first base plate, and a second unimorph type acceleration detection element includes the second resonator bonded to one surface of the second base plate, wherein each of the first and second unimorph type acceleration detection elements is fixed at one longitudinal end thereof or opposed longitudinal ends thereof such that the first resonator and the second resonator are substantially diametrically opposed to each other or are arranged to face each other to allow the first resonator and the second resonator to independently deflect in response to the application of acceleration, and wherein when the two acceleration detection elements are independently deflected in response to the application of acceleration, acceleration is detected by detecting a difference between frequency changes of the first resonator and the second resonator or a difference between impedance changes of the first resonator and the second resonator.

Since the acceleration detection element has a unimorph structure having the resonator and the base plate bonded to each other, compressive stress and tensile stress required by the resonator are effectively generated in response to deflection of the acceleration detection element taking place under acceleration. The pair of acceleration detection elements are constructed by connecting the pair of resonators in an end to end fashion or in a broadside to broadside fashion. When the one detection element detects tensile stress, the other detection element detects compressive stress. The resonance frequency of the tensile side resonator becomes lower while the resonance frequency of the compressive side resonator becomes higher. Acceleration is thus detected by detecting a difference between frequency changes of the two resonator or a difference between impedance changes of the two resonators. Since the frequency difference or the impedance difference is detected rather than individually picking up the frequency changes of the two resonators or the impedance changes of the two resonator, stresses commonly acting on the two resonators (a stress due to a temperature change, for example) cancel each other out. A high-gain acceleration sensor free from the effect of temperature changes results.

Preferably, a flexurally neutral plane of deflection in response to acceleration lies in the bonding surface between the first resonator and the first base plate or within the first base plate in the first element, and a flexurally neutral plane of deflection in response to acceleration lies in the bonding surface between the second resonator and the second base plate or within the second base plate in the second element. If the flexurally neutral plane lies in the resonator side, both compressive stress and tensile stress occur within the same resonator, resulting in a weaker output signal. To position the flexurally neutral plane in the bonding surface between the resonator and the base plate or within the base plate side, the flexural rigidity of the base plate is set to be not less than that of the resonator.

Preferably, each of the first and second resonators is a vibration mode element in which energy is trapped to the longitudinal center portion thereof, and gaps are respectively provided between the first base plate and the first resonator and between the second base plate and the second resonator, the gaps being larger in area than a trapped vibration region of each of the first and second resonators and smaller in area than a deflection region of each of the first and second resonators which deflects under acceleration.

Laminating the resonator and the base plate on the entire surfaces thereof is acceptable. However, it is noted that such an arrangement reduces performance of the resonator (such as Q and K factors) because the vibration of the resonator is restricted by the base plate.

If the resonator and the base plate are laminated together on the entire surfaces thereof, the acceleration detection element is efficient in generating stress in response to acceleration although the performance of the resonator slightly drops.

Preferably, longitudinal ends of the first and second acceleration detection elements are bonded to face each other with a spacer layer interposed therebetween, wherein the external surface of each of the first and second acceleration detection elements, facing in a direction in which acceleration is applied, is covered with a casing member, and each open surface which the first and second acceleration detection element and the casing member define is covered with a covering member, and wherein the electrodes arranged on the first and second resonators are respectively connected to external electrodes arranged on the surface of the covering member through internal electrodes arranged on the surface of the casing member.

In this arrangement, the acceleration detection element is fully enclosed the casing member and the covering member, and is thereby appropriate for use as a surface-mounting electronic component.

The present invention in a second aspect relates to an acceleration sensor and includes a first resonator and a second resonator, each resonator including a piezoelectric body and electrodes arranged on main surfaces thereof, and a single base plate, wherein the first resonator and the second resonator are respectively bonded to both sides of the base plate, wherein the acceleration detection element is fixed at one longitudinal end thereof or opposed longitudinal ends thereof such that the acceleration detection element deflects in response to acceleration applied in a direction in which the first and second resonators are laminated to each other, and wherein when the acceleration detection element is deflected in response to the application of acceleration, acceleration is detected by detecting a difference between frequency changes of the first resonator and the second resonator or a difference between impedance changes of the first resonator and the second resonator.

In contrast to the first aspect of the present invention in which the two unimorph type acceleration detection elements are employed, the present invention in the second aspect employs a bimorph type acceleration detection element which is constructed by bonding the resonators respectively to both sides of the single base plate. In this arrangement, a flexurally neutral plane (having zero stress) is set to lie within the base plate even if a relatively flexible material is used for the base plate, and the resonators arranged on both sides of the base plate effectively generate tensile stress and compressive stress. Acceleration is thus detected by differentially detecting the frequency changes of the two resonators or the impedance changes of the two resonators. The use of the single base plate reduces thickness dimension of the acceleration detection element, and the acceleration sensor is thus made compact.

Preferably, each of the first and second resonators is a vibration mode element in which energy is trapped to the longitudinal center portion thereof, and gaps are respectively provided between the base plate and the first resonator and between the base plate and the second resonator, the gaps being larger in area than a trapped vibration region of each of the first and second resonators and smaller in area than a deflection region of each of the first and second resonators which deflects in response to acceleration.

Preferably, the external surface of the acceleration detection element, facing in a direction in which acceleration is applied, is covered with a casing member, and each open surface which the acceleration detection element and the casing member define is covered with a covering member, and wherein the electrodes arranged on the first and second resonators are respectively connected to external electrodes arranged on the surface of the covering member via internal electrodes arranged on the surface of the casing member. In this arrangement, the acceleration detection element is fully enclosed the casing member and the covering member, and is thereby appropriate for use as a surface-mounting electronic component.

The acceleration sensor of the present invention uses two methods for differentially picking up the signals from the first resonator and the second resonator and for obtaining a signal proportional to acceleration acting on the acceleration detection elements. In one method, the first and second resonators are oscillated at different frequencies, a difference between the oscillated frequencies is detected, and a signal proportional to acceleration is determined from the frequency difference. In the other method, the first and second resonators are oscillated at the same frequency, one of a phase difference and an amplitude difference is obtained from a difference between electric impedances of the two resonators, and a signal proportional to acceleration is determined from one of the phase difference and the amplitude difference.

Acceleration is detected with high accuracy using either of the above two methods.

DESCRIPTION OF THE PREFERRED EMBODIMENTS

FIG. 1 through FIG. 5 show an acceleration sensor 1A of a first embodiment of the present invention.

The acceleration sensor 1A includes two acceleration detection elements 2 and 3 supported at both ends thereof within insulating cases 5 and 6 made of insulating ceramic. The acceleration detection elements 2 and 3 are of a unimorph type detection element. The acceleration detection element 2 includes a resonator 20 which includes a piezoelectric strip and electrodes 21 and 22 provided respectively on both main surfaces thereof, and a base plate 23 having one surface to which the resonator 20 is bonded to or soldered. Similarly, the acceleration detection element 3 includes a resonator 30 which includes a piezoelectric strip and electrodes 31 and 32 provided respectively on both main surfaces thereof, and a base plate 33 having one surface to which the resonator 30 is bonded or soldered. The resonators 20 and 30 are of an energy-trapping thickness-shear slide mode resonator, and are polarized in the longitudinal direction thereof. The electrodes 21 and 22 in the ends thereof face each other in the center portion of the resonator 20 and extend from there toward different opposed ends of the resonator 20. The electrodes 31 and 32 in the ends thereof face each other in the center portion of the resonator 30 and extend from there toward different opposed ends of the resonator 30.

The base plates 23 and 33 are insulators having the same length and the same width as those of the resonator 20 and 30. Flexurally neutral planes of the unimorph type acceleration detection elements 2 and 3 (as represented by broken lines N1 and N2 in FIG. 5) are designed to lie in the base plates 23 and 33 from the bonding surfaces of the resonators 20 and 30 with the base plates 23 and 33. Preferably, the base plates 23 and 33 are fabricated of a material having a flexural rigidity higher than that of the material of the resonators 20 and 30. Preferably, the base plates 23 and 33 have a larger mass to function as a weight The base plates 23 and 33 respectively have recesses 23a and 33a on the surfaces thereof respectively facing resonators 20 and 30. The recesses 23a and 33a are larger than in area than trapped vibration regions of the resonators 20 and 30 and smaller in range than deflection regions of the resonators 20 and 30 being deflected under acceleration. In this way, trapped vibration in the resonators 20 and 30 is not restricted, while the resonators 20 and 30 and the base plates 23 and 33 are deflected integrally.

Figure 5:
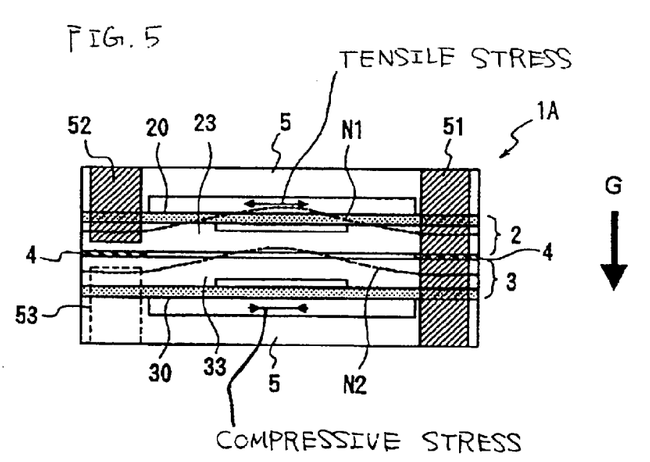
FIG. 5 is a cross-sectional view of the acceleration sensor taken along line V—V in FIG. 4.

The recesses 23a and 33a are intended to assure a vibration space not to interfere with the vibration of the resonators 20 and 30. Since the amplitude of the vibration is small, the gap caused by the thickness of an adhesive agent applied between the resonator 20 and the base plate 23 and between the resonator 30 and the base plate 33 may be substituted for the recesses 23a and 33a.

Figure 2:
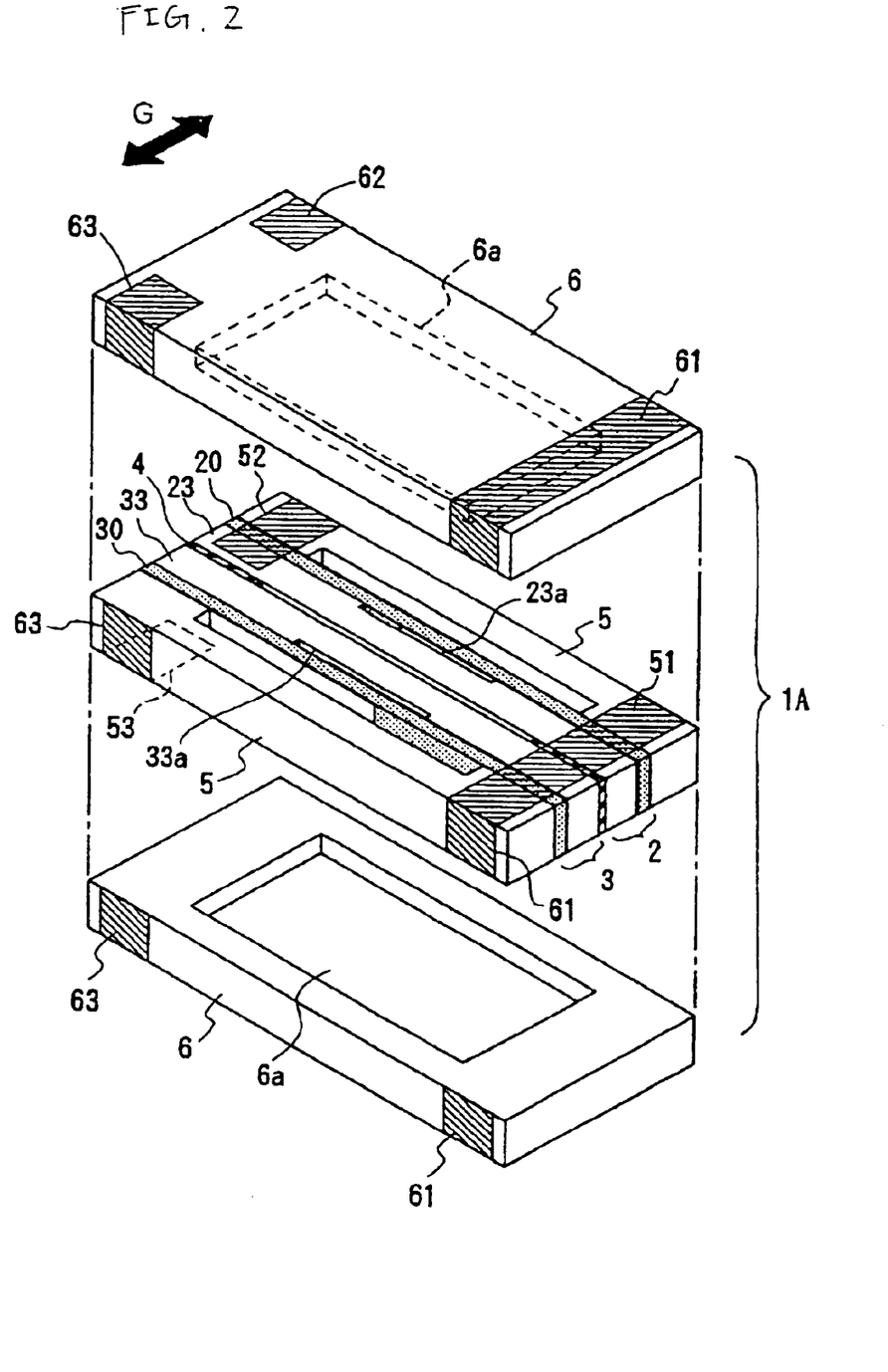
FIG. 2 is an exploded perspective view of the acceleration sensor shown in FIG. 1.
Figure 3:
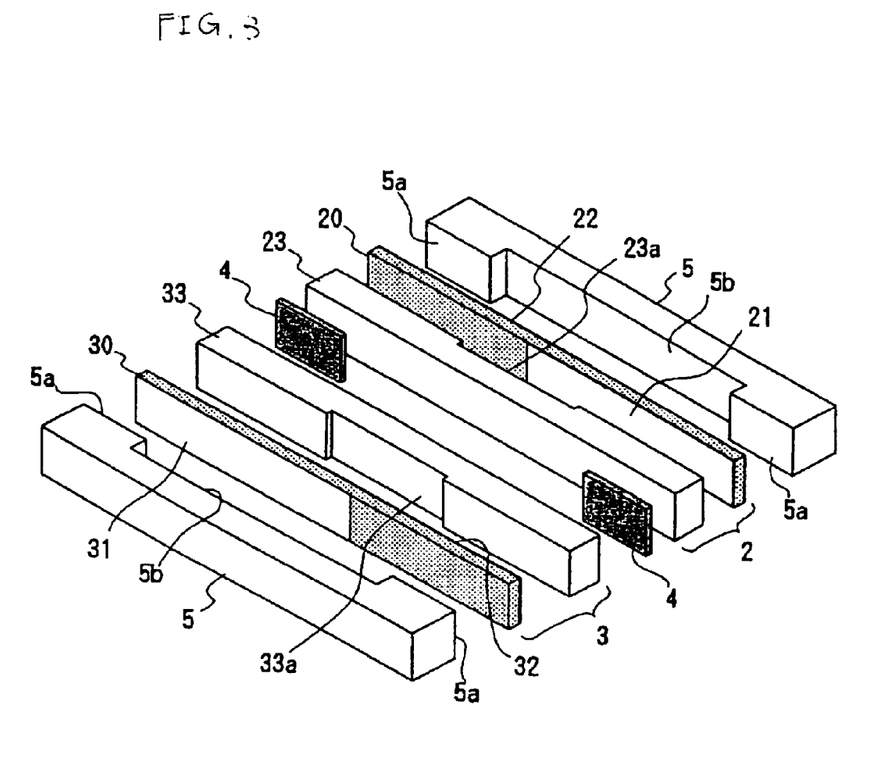
FIG. 3 is an exploded perspective view of the acceleration sensor shown in FIG. 1 with a covering member removed therefrom.

The two unimorph type acceleration detection elements 2 and 3 are laminated together with adhesive layers 4 as spacer layers interposed therebetween at longitudinally opposed ends thereof such that the resonators 20 and 30 are generally diametrically opposed to each other in an end to end fashion. That is, the base plate 23 of the acceleration detection element 2 and the base plate 33 of the acceleration detection element 3 face each other via the spacer layer 4, and thus the resonators 20 and 30 face away as shown in FIG. 2. In this way, the resonators 20 and 30 are independently deflected in the directions in which acceleration G is applied. A predetermined gap is thus allowed between the acceleration detection elements 2 and 3 in the center portions thereof. A pair of casing members 5 and 5 respectively cover the external surfaces of the acceleration detection elements 2 and 3 facing in the direction in which the acceleration G acts. Each of the casing members 5 has a flattened U-shaped cross section with both projecting segments 5a thereof rigidly bonded to external opposed ends of each of the acceleration detection elements 2 and 3 (external surfaces of the resonators 20 and 30). Recesses 5b thus form gaps respectively between the one casing member 5 and the acceleration detection element 2 and between the other casing member 5 and the acceleration detection element 3. The gaps thus allow the acceleration detection elements 2 and 3 to deflect in response to the acceleration G. The top and bottom open surfaces of an assembly of the acceleration detection elements 2 and 3, and the casing members 5 are then covered respectively with top and bottom covering members 6 and 6 from above and below. The covering members 6 respectively have, on the inner surfaces thereof, recess 6a forming a gap not to contact respectively the acceleration detection elements 2 and 3. The peripheral outline portion of each of covering members 6 is rigidly bonded to the top and bottom surfaces of the assembly. Displaceable portions of the acceleration detection elements 2 and 3 are fully enclosed in the casing members 5 and the covering member 6.

Figure 11A:
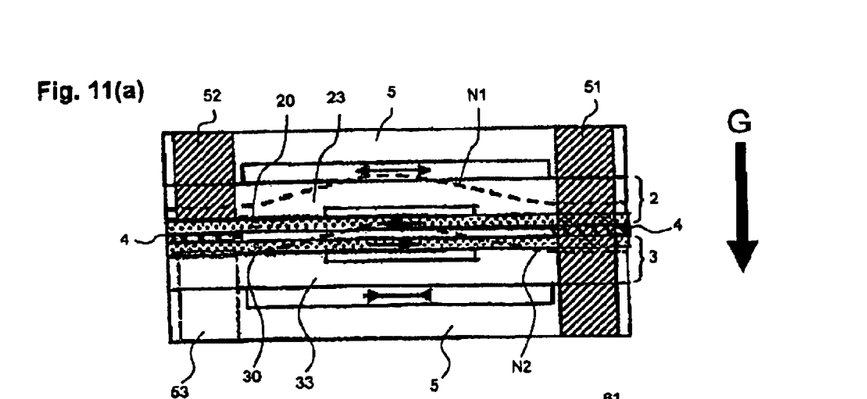
FIG. 11(a) is cross-sectional view of an acceleration sensor taken along line V—V in FIG. 11(b)
Figure 11B:
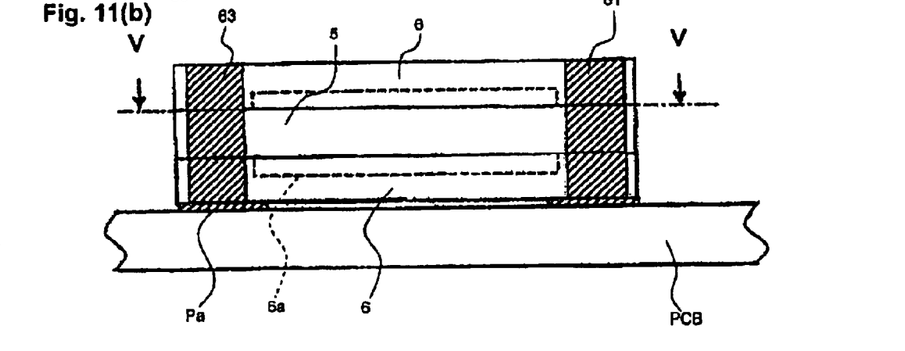
FIG. 11(b) is side view of an acceleration sensor mounted on a printed circuit board.

The acceleration detection elements 2 and 3 are bonded together with the adhesive layers 4 interposed therebetween in a manner such that the resonators 20 and 30 are generally diametrically opposed in an end to end fashion. Conversely, the acceleration detection elements 2 and 3 may be bonded together such that the resonators 20 and 30 face each other in a broadside to broadside fashion as shown in FIGS. 11(a) and 11(b). In this arrangement, a tensile side resonator and a compressive side resonator are reversed in position under the acceleration G.

The casing members 5 having a U-shaped cross section are used in this embodiment. If a vibration space is assured by the thickness of each adhesive layer applied between the one casing member 5 and the acceleration detection element 2 and between the other casing member 5 and the acceleration detection element 3, the casing members 5 may be formed of a planar member. Since the deflection of each of the acceleration detection elements 2 and 3 under the acceleration G is small in amplitude, the thickness of the adhesive layer provides a sufficiently large vibration space.

Similarly, since a gap is formed by the thickness of an adhesive layer applied in the inner surface of the covering member 6, the gap forming recess 6a in the inner surface of the covering member 6 is dispensed with.

The base plates 23 and 33, the casing members 5, and the covering member 6 are fabricated of insulating materials. Specifically, these components may be fabricated of ceramic substrates or resin substrates. The material of the base plates 23 and 33 is not limited to an insulating material, and may be fabricated of a metal.

The electrodes 21 and 32, out of the electrodes 21 and 22, and the electrodes 32 and 32 formed in the resonators 20 and 30, are electrically connected to each other through an internal electrode band 51 arranged on the open surface of the assembly composed of the acceleration detection elements 2 and 3 and the casing members 5, and the internal electrode band 51 is routed out of the external surface of the casing member 5. The electrode 22 is routed out of the external surface of the casing member 5 through an internal electrode band 52 arranged on the top open surface of the assembly. The electrode 31 is routed out of the different external surface of the casing member 5 through an internal electrode band 53 arranged on the bottom open surface of the assembly.

Figure 1:
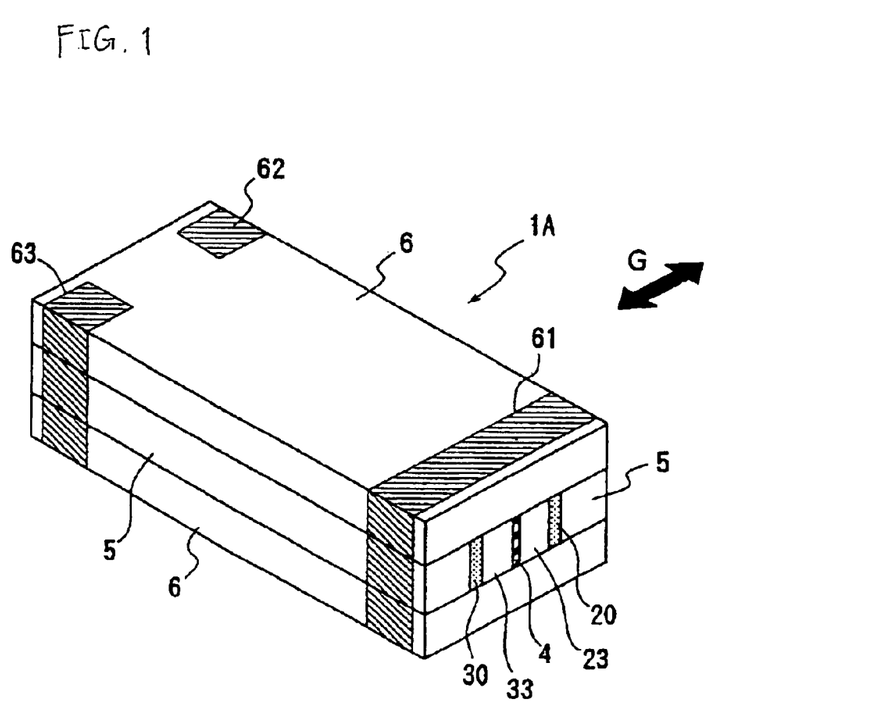
FIG. 1 is a general perspective view showing a first embodiment of the acceleration sensor of the present invention.

Referring to FIG. 1, the casing members 5 and the covering member 6 have, on the external surfaces thereof, external electrodes 61, 62, and 63. The internal electrode bands 51, 52, and 53 are respectively electrically connected to the external electrodes 61, 62, and 63. In this way, a surface-mounting chip type acceleration sensor results.

In this embodiment, the one electrode 21 of the acceleration detection element 2 (the resonator 20) is electrically connected to the one electrode 32 of the acceleration detection element 3 (the resonator 30) through the internal electrode band 51 as a common electrode. Alternatively, the four electrodes 21, 22, 31, and 32 may be independently routed to respective external electrodes. In this case, the four internal electrode bands and the four external electrodes may be used.

Figure 4:
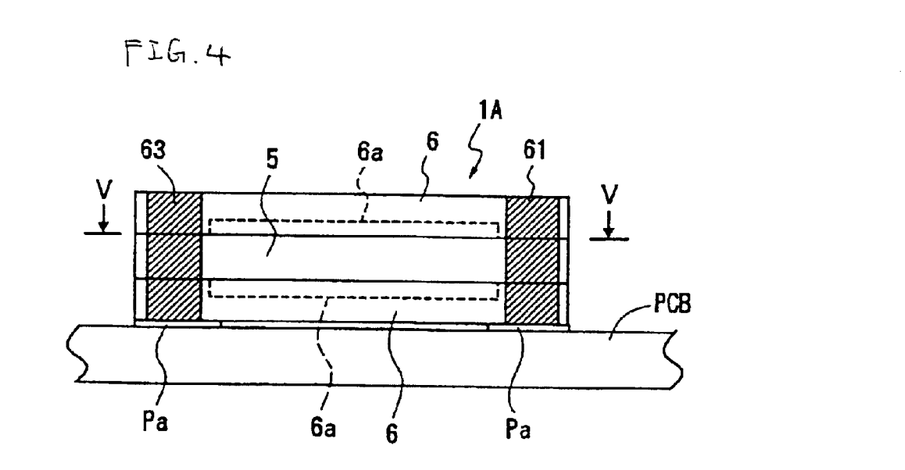
FIG. 4 is a side view of the acceleration sensor shown in FIG. 1 mounted on a printed circuit board.

FIG. 4 shows the acceleration sensor 1A mounted on a circuit pattern P1 of a printed circuit board PCB.

Figure 6A:
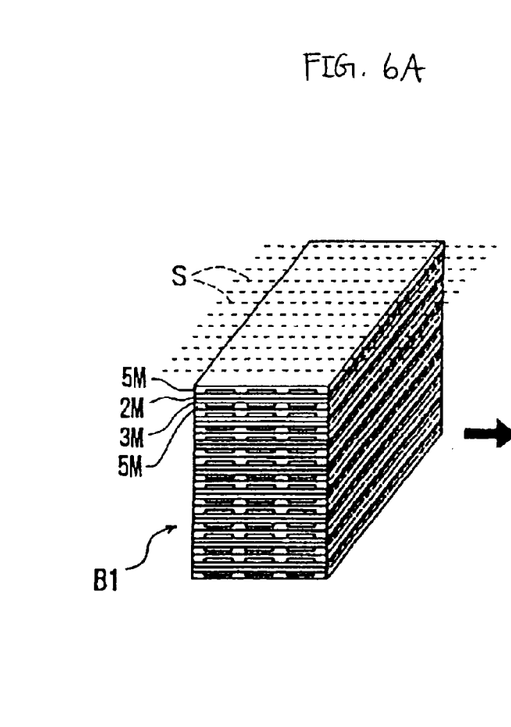
FIGS. 6A–6C show process diagrams showing a manufacturing method for manufacturing the acceleration sensor shown in FIG. 1.
Figure 6B:
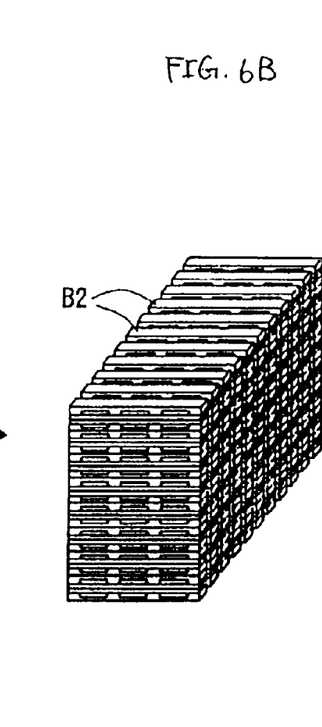
Figure 6C:
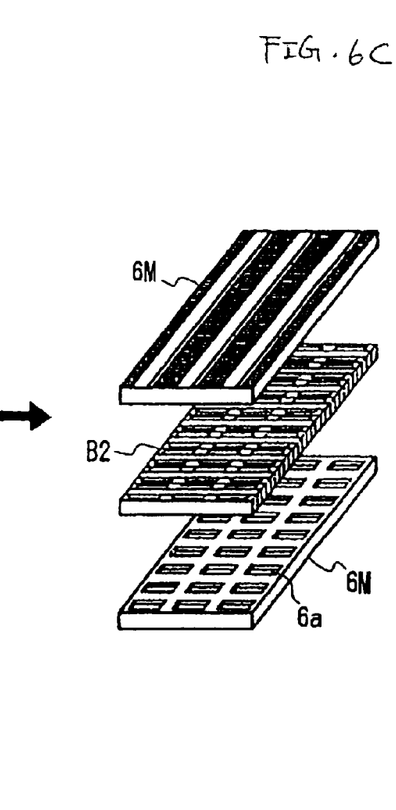

FIG. 6 shows a manufacturing method for manufacturing the acceleration sensor 1A having the above-referenced construction.

Two piezoelectric ceramic sheets for the resonators 20 and 30, having electrode patterns as the electrodes 21 and 22 and the electrodes 31 and 32 respectively arranged on both main sides thereof, are respective bonded to two base plate sheets for the base plates 23 and 33. Assembly sheets 2M and 3M for the acceleration detection elements are thus produced. A pair of casing member sheets 5M for the casing members 5, having recesses 5b each having a predetermined width at regular intervals are prepared. The sheets 2M, 3M and 5M are bonded together into a laminate structure using an adhesive agent. A block B1 is thus obtained by stacking a plurality of laminate structures (see FIG. 6A). The block B1 is diced along cut lines S as shown in FIG. 6A, and a plurality of individual blocks B2 are thus obtained (see FIG. 6B).

The cut individual blocks B2 are laid on their sides, and covering member sheets 6M having a number of gap forming recesses 6a on the internal surfaces thereof are bonded to each of the individual block B2 from above and below as shown in FIG. 6C. A final block is thus obtained. The covering member sheet 6M has patterns serving as external electrodes. The final block is vertically and horizontally cut into individual sensor devices. Electrodes are arranged on the sides and ends of each cut individual sensor device using a sputtering technique. The acceleration sensor 1A shown in FIG. 1 thus results.

Since the sheets for each member are prepared, and then laminated and bonded together in the state of sheet rather than individual strips in this way, production yield is high, and a uniform-quality and low-cost acceleration sensor 1A is thus provided.

Figure 7:
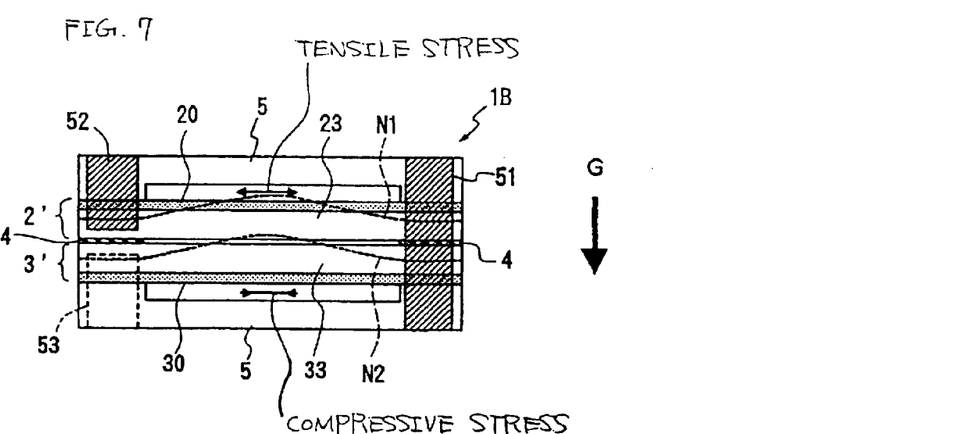
FIG. 7 is similar to the cross-sectional view of FIG. 5 taken along line V—V in FIG. 4, but showing a second embodiment of the acceleration sensor of the present invention.

FIG. 7 shows a second embodiment of the acceleration sensor 1B. The acceleration sensor 1B includes planar base plates 23 and 33 having no recesses. Resonators 20 and 30 are respectively bonded to the surfaces of the base plates 23 and 33, thereby forming acceleration detection elements 2' and 3'. The acceleration detection elements 2' and 3' are bonded together at the opposed longitudinal ends thereof with adhesive layers 4 interposed therebetween. Casing members 5 and 5, each having a U-shaped cross section, are fixed to the acceleration detection elements 2' and 3' from outside. Open surfaces of the acceleration detection elements 2' and 3' and the casing members 5 are then covered with covering members 6 (not shown) from above and from below.

In the first embodiment, the base plates 23 and 33 respectively have, on the surfaces thereof respectively facing resonators 20 and 30, recesses 23a and 33a which are larger in area than trapped vibration regions of the resonators 20 and 30 and smaller in range than deflection regions of the resonators 20 and 30 being deflected under acceleration. In this arrangement, however, the resonators 20 and 30 are individually deflected, and both sides of each resonator respectively become a tensile surface and a compressive surface. This arrangement does not necessarily lead to a large magnitude output. In the second embodiment, the base plates 23 and 33 are respectively laminated to the resonators 20 and 30 on the entire surfaces thereof so that the base plates 23 and 33 and the resonators 20 and 30 are deflected in an integral motion in response to acceleration G. Stress is thus effectively generated, leading to a high power output.

However, since trapped vibration of the resonators 20 and 30 is restricted by the base plates 23 and 33 in this arrangement, performance of the resonators (such as Q and K factors) is possibly slightly degraded.

Figure 8:
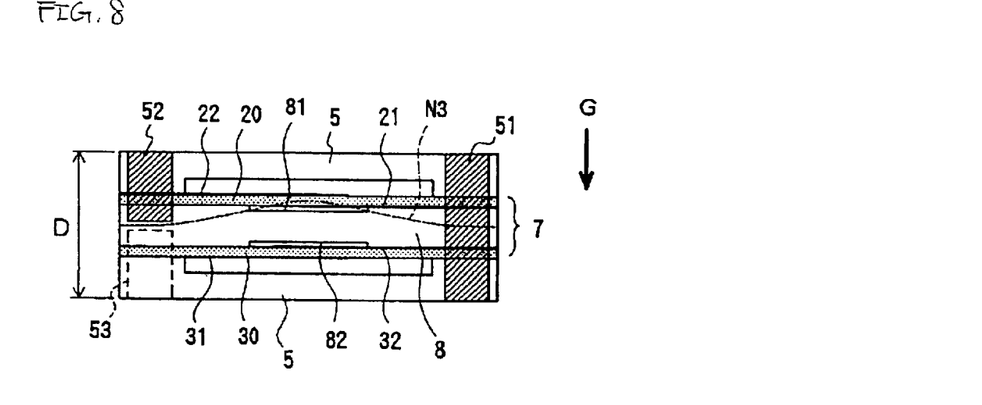
FIG. 8 is similar to the cross-sectional view of FIG. 5 taken along line V—V in FIG. 4, but showing a third embodiment of the acceleration sensor of the present invention.

FIG. 8 shows a third embodiment of the acceleration sensor 1C.

The acceleration sensor 1C includes an acceleration detection element 7 which is constructed by bonding respectively resonators 20 and 30 on both sides of a single base plate 8. The resonator 20 bears electrodes 20 and 21 respectively on both main surfaces thereof. The resonator 30 bears electrodes 31 and 32 respectively on both main surfaces thereof. The acceleration detection element 7 are supported at the longitudinal opposed ends thereof by casing members 5 having a U shape in cross section from both sides as shown in FIG. 2. The open sides of the acceleration detection element 7 are respectively covered with covering members 6 (not shown).

The resonators 20 and 30 are of an energy-trapping thickness-shear slide mode resonator as in the first embodiment. The base plate 8 has, on both sides, gap forming recesses 81 and 82 which are larger than in area than trapped vibration regions of the resonators 20 and 30 and smaller in range than deflection regions of the resonators 20 and 30 being deflected under acceleration. The use of the recesses 81 and 82 in the base plate 8 is not a requirement of the present invention. The resonators 20 and 30 may be bonded to the base plate 8 on the interface area of each side thereof except the central portion of each side or fully on the interface area of each side.

In the third embodiment, the resonators 20 and 30 are respectively bonded to both sides of the single base plate 8, and a flexurally neutral plane N3 generally lies at the center of the thickness of the base plate 8 as represented by a dotted line in FIG. 8. When acceleration G is applied, the base plate 8 functions as a mass body, thereby effectively causing tensile stress in the one resonator 20 and compressive stress in the other resonator 30. A large frequency difference or a large impedance difference is thus obtained in response to the application of acceleration G. In contrast to the first embodiment in which the two unimorph type detection elements 2 and 3 are used, the single base plate 8 suffices. Thickness dimension D of the acceleration detection element 7 is reduced, and a compact acceleration sensor results.

Figure 9:
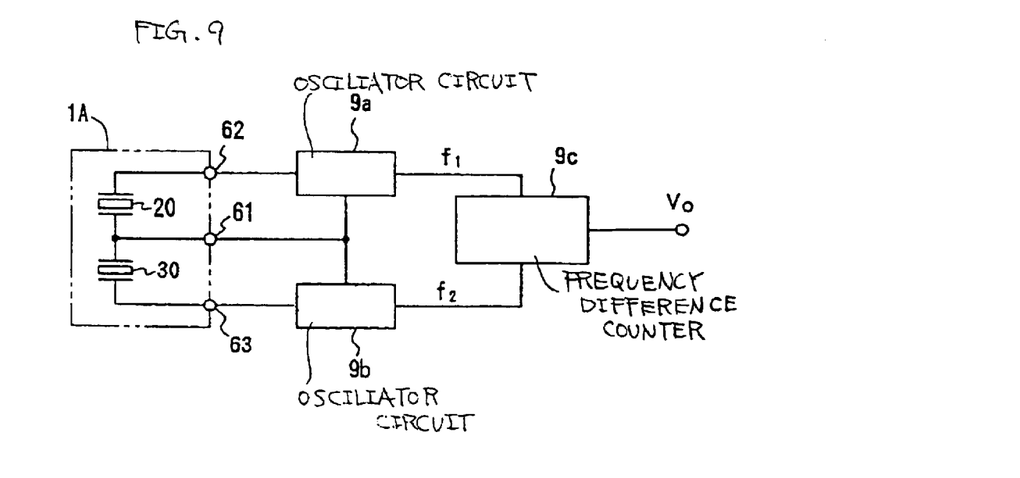
FIG. 9 is a circuit diagram showing an acceleration detection device using the acceleration sensor of the present invention.

FIG. 9 shows an acceleration detection device employing the acceleration sensor 1A. The device uses independent oscillation of the acceleration detection elements 2 and 3. The external electrodes 61 and 62 of the acceleration sensor 1A are connected to an oscillator circuit 9a, and the external electrodes 61 and 63 are connected to an oscillator circuit 9b. The oscillator circuits 9a an 9b may be a known Colpitt's oscillator. The resonators 20 and 30 are independently oscillated by the oscillator circuits 9a and 9b, and oscillated frequencies $f_1$ and $f_2$ are input to a counter 9c. The counter 9c outputs a signal $V_0$ in proportion to the frequency difference.

When no acceleration G is applied to the acceleration sensor 1A, the two resonators 20 and 30 are oscillated at constant frequencies as independent resonators. If the resonators 20 and 30 have a fully identical structure, they are oscillated at the same frequency, and the output signal $V_0$ of the counter 9c is zero. When acceleration G is applied to the acceleration sensor 1A, inertia in a direction opposite to the direction of applied acceleration acts on the acceleration detection elements 2 and 3. The central portions of the acceleration detection elements 2 and 3 are deflected in the direction opposite to the direction of the applied acceleration. Associated with the deflection of the acceleration detection elements 2 and 3, tensile stress is generated in the one resonator 20 and compressive stress is generated in the other resonator 30 as shown in FIG. 5. In the resonator working on the thickness-shear vibration mode, the tensile resonator 20 drops in oscillation frequency while the compressive resonator 30 rises in oscillation frequency. The frequency difference is output from the electrodes 21, 22, 31, and 32 to the external electrodes 61, 62, and 63 through the internal electrode bands 51, 52, and 53. The signal $V_0$ proportional to the acceleration G is thus obtained. Not only the magnitude of the acceleration G but also the direction of the acceleration G are detected from the signal $V_0$.

When the acceleration sensor 1A is used in a temperature varying environment, the resonators 20 and 30, the base plates 23 and 33, the casing members 5, and the covering members 6 thermally expand. When the thermal expansion coefficient of the resonators 20 and 30 is different from that of the base plates 23 and 33, the acceleration detection elements 2 and 3 suffer from deformation due to temperature changes, and stresses are generated in the resonators 20 and 30. Similarly, when the thermal expansion coefficient of the acceleration detection elements 2 and 3 is different from that of the casing members 5 and the covering members 6, stresses are generated in the acceleration detection elements 2 and 3 due to temperature changes. However, if the resonators 20 and 30 are fabricated of the same material and are identically configured, and the base plates 23 and 33 are fabricated of the same material and are identically configured, generated stresses also become equal. Since the frequency counter 9c provides a difference between the outputs of the resonators 20 and 30, changes taking in the output signals when the resonators 20 and 30 are equally subject to a temperature change cancel each other out. An acceleration detection device susceptible to acceleration G only is thus provided.

Figure 10:
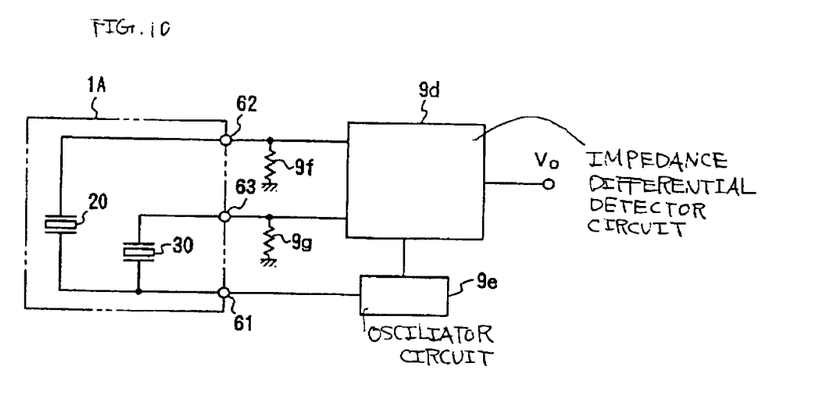
FIG. 10 is a circuit diagram showing another acceleration detection device using the acceleration sensor of the present invention.

FIG. 10 shows another acceleration detection device employing the acceleration sensor 1A. The acceleration detection device uses a single oscillation of the acceleration detection elements 2 and 3. The external electrodes 62 and 63 of the acceleration sensor 1A are connected to an impedance differential detector circuit 9d. The external electrode 61 as a common electrode is connected to an oscillator circuit 9e. Also included in the device are matching resistors 9f and 9g. The two resonators 20 and 30 are oscillated at the same frequency by the oscillator circuit 9e. A phase difference or an amplitude difference is detected from a difference between electric impedances of the resonators 20 and 30, and an output $V_0$ proportional to acceleration G is obtained from the impedance differential detector circuit 9d. To cause the two resonators 20 and 30 to oscillate at the same frequency, the oscillator circuit 9e is arranged so that one of the outputs of the two resonators or the sum of the outputs of the two resonators are fed back.

In this example, again, the signal proportional to acceleration G is picked up, while changes in the outputs due to a temperature change cancel each other out. An acceleration detection device sensitive to the acceleration G only is thus provided.

The acceleration sensor 1A of the first embodiment is employed in the acceleration detection devices shown in FIG. 9 and FIG. 10, and each of the acceleration sensors 1B and 1C respectively shown in FIG. 7 and FIG. 8 may be equally used.

Figure 12A:
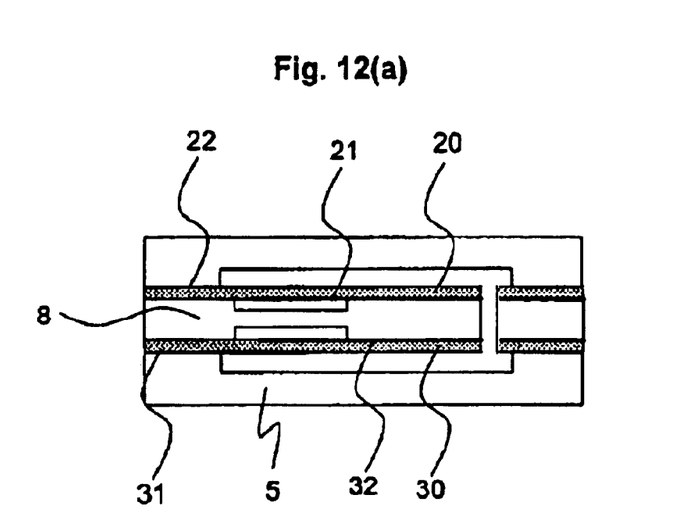
FIGS. 12(a) and 12(b) are cross-sectional views of modifications of the acceleration sensor of the present invention.
Figure 12B:
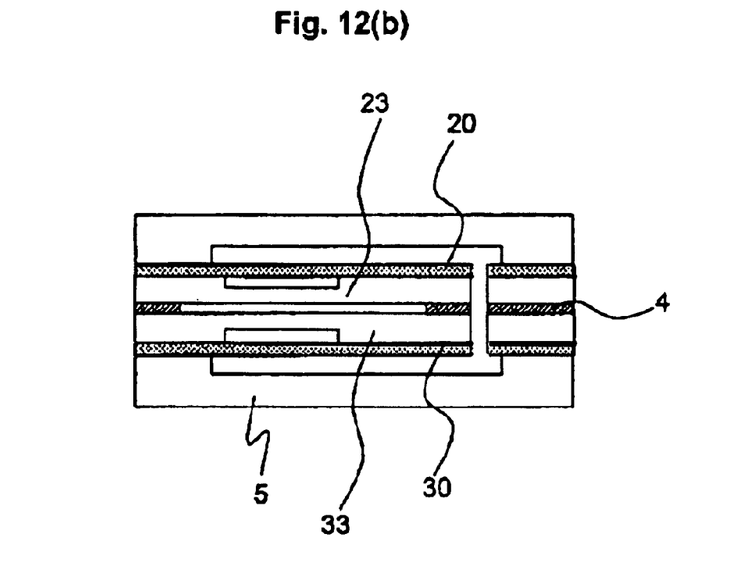

Each of the acceleration sensors 1A, 1B, and 1C is structured so that the detection element is rigidly supported at both ends thereof by the casing member. Alternatively, the detection element may be supported at one end only, i.e., may have a cantilever structure as shown in FIGS. 12(a) and 12(b). In this case, displacement of the detection element at the free end thereof is large under acceleration, and a large frequency change or a large impedance change may be obtained.

The acceleration sensors 1A, 1B, and 1C of the first through third embodiments employ a thickness-shear resonator for the resonators 20 and 30. The present invention is not limited to this mode. Other modes (such as a thickness vibration mode, a longitudinal vibration mode, an area flexural vibration mode, etc.) may be used.

In accordance with the present invention, the pair of acceleration detection elements, each having a unimorph structure in which the resonator and the base plate are bonded together, are connected to be generally diametrically opposed in an end to end fashion or to face each other in a broadside to broadside fashion. When the acceleration detection elements are deformed in response to acceleration, compressive stress is generated in one resonator while tensile stress is generated in the other resonator in an effective way. By differentially picking up the frequency change of the two resonators or the impedance change of the two resonators, a signal proportional to acceleration is obtained. A high detection-gain acceleration sensor is thus provided.

Since acceleration is detected using the frequency change or the impedance change, acceleration of DC or low-frequency components may be detected.

Since stress resulting from a temperature change is exerted on the two resonators, stresses due to factors other than acceleration cancel each other out by differentially picking up the outputs of the two resonators. An acceleration sensor susceptible to acceleration only is thus provided.

Since the acceleration detection elements have a simple construction and routing the electrodes out is easy, a compact design is implemented. The acceleration detection element is thus structured into a surface-mounting component (a chip component).

The acceleration detection element is produced by bonding the first and second resonators, each formed of a piezoelectric body and having electrodes on both main surfaces thereof, to both sides of the single base plate. When acceleration is applied in this arrangement, compressive stress is generated in the one resonator while tensile stress is generated in the other resonator. By differentially picking up the frequency differences of the two resonators or the impedance differences of the two resonators, the signal proportional to acceleration is obtained. A high detection-gain acceleration sensor susceptible to acceleration only is thus provided.

The acceleration sensor is thus free from the effect of temperature changes and is easily structured into a compact and chip-type component.

Since the resonators are bonded to both sides of the single base plate, the thickness dimension of the sensor is reduced. An even more compact acceleration sensor results.

What is claimed is:

1. An acceleration sensor comprising:

a first resonator and a second resonator which resonate at independent frequencies and each of which includes a piezoelectric body and electrodes arranged on both main surfaces thereof; and a first base plate and a second base plate;

wherein a first unimorph acceleration detection element includes said first resonator bonded to one surface of said first base plate, and a second unimorph acceleration detection element includes said second resonator bonded to one surface of said second base plate;

wherein each of said first and second unimorph acceleration detection elements is supported at one longitudinal end thereof or at opposed longitudinal ends thereof such that said first resonator and said second resonator are substantially diametrically opposed to each other or are arranged to face each other to allow said first resonator and said second resonator to independently deflect in response to the application of acceleration;

wherein when said two acceleration detection elements are independently deflected in response to the application of acceleration, acceleration is detected by detecting a difference between frequency changes of said first resonator and said second resonator or a difference between impedance changes of said first resonator and said second resonator; and wherein each of said first and second resonators is a vibration mode element in which energy is trapped to the longitudinal center portion thereof, and wherein gaps are respectively provided between said first base plate and said first resonator and between said second base plate and said second resonator, said gaps being larger in area than a trapped vibration region of each of said first and second resonators and smaller in area than a deflection region of each of said first and second resonators which deflects in response to acceleration.

2. An acceleration sensor according to claim 1, wherein a flexurally neutral plane of deflection in response to acceleration lies in the bonding surface between said first resonator and said first base plate or within said first base plate, and a flexurally neutral plane of deflection in response to acceleration lies in the bonding surface between said second resonator and said second base plate or within said second base plate.

3. An acceleration sensor according to claim 1, wherein longitudinal ends of said first and second acceleration detection elements are bonded to face each other with a spacer layer interposed therebetween, wherein the external surface of each of said first end second acceleration detection elements, facing in a direction in which acceleration is applied, is covered with a casing member, and each open surface which said first and second acceleration detection elements and said casing member define is covered with a covering member, and wherein the electrodes arranged on said first and second resonators are respectively connected to external electrodes arranged on the surface of said covering member via internal electrodes arranged on the surface of the casing member.

4. An acceleration sensor comprising an acceleration detection element including a first resonator and a second resonator, each resonator including a piezoelectric body and electrodes arranged on main surfaces thereof, and a single base plate, wherein said first resonator and said second resonator are respectively bonded to both sides of said base plate;

wherein said acceleration detection element is supported at one longitudinal end thereof or opposed longitudinal ends thereof such that said acceleration detection element deflects in response to acceleration applied in a direction in which said first and second resonators are laminated to each other;

wherein when said acceleration detection element is deflected in response to the application of acceleration, acceleration is detected by detecting a difference between frequency changes of said first resonator and said second resonator or a difference between impedance changes of said first resonator and said second resonator; and wherein each of said first and second resonators is a vibration mode element in which energy is trapped to the longitudinal center portion thereof, and wherein gaps are respectively provided between said base plate and said first resonator and between said base plate and said second resonator, said gaps being larger in area than a trapped vibration region of each of said first and second resonators and smaller in area than a deflection region of each of said first and second resonators which deflects in response to acceleration.

5. An acceleration sensor according to claim 4, wherein the external surface of said acceleration detection element, facing in a direction in which acceleration is applied, is covered with a casing member, and each open surface which said acceleration detection element and said casing member define is covered with a covering member, and wherein the electrodes arranged on said first and second resonators are respectively connected to external electrodes arranged on the surface of said covering member via internal electrodes arranged on the surface of the casing member.

6. An acceleration sensor according to one of claims 1 and 4, wherein said first and second resonators are oscillated at different frequencies, a difference between the oscillated frequencies is detected, and a signal proportional to acceleration is determined from the frequency difference.

7. An acceleration sensor according to one of claims 1 and 4, wherein said first and second resonators are oscillated at the same frequency, one of a phase difference and an amplitude difference is obtained from a difference between electric impedances of said two resonators, and a signal proportional to acceleration is determined from one of the phase difference and the amplitude difference.

* * * * *